June 13, 1944. W. J. AIGNER ET AL 2,350,993
LICENSE PLATE HOLDER
Filed May 17, 1941
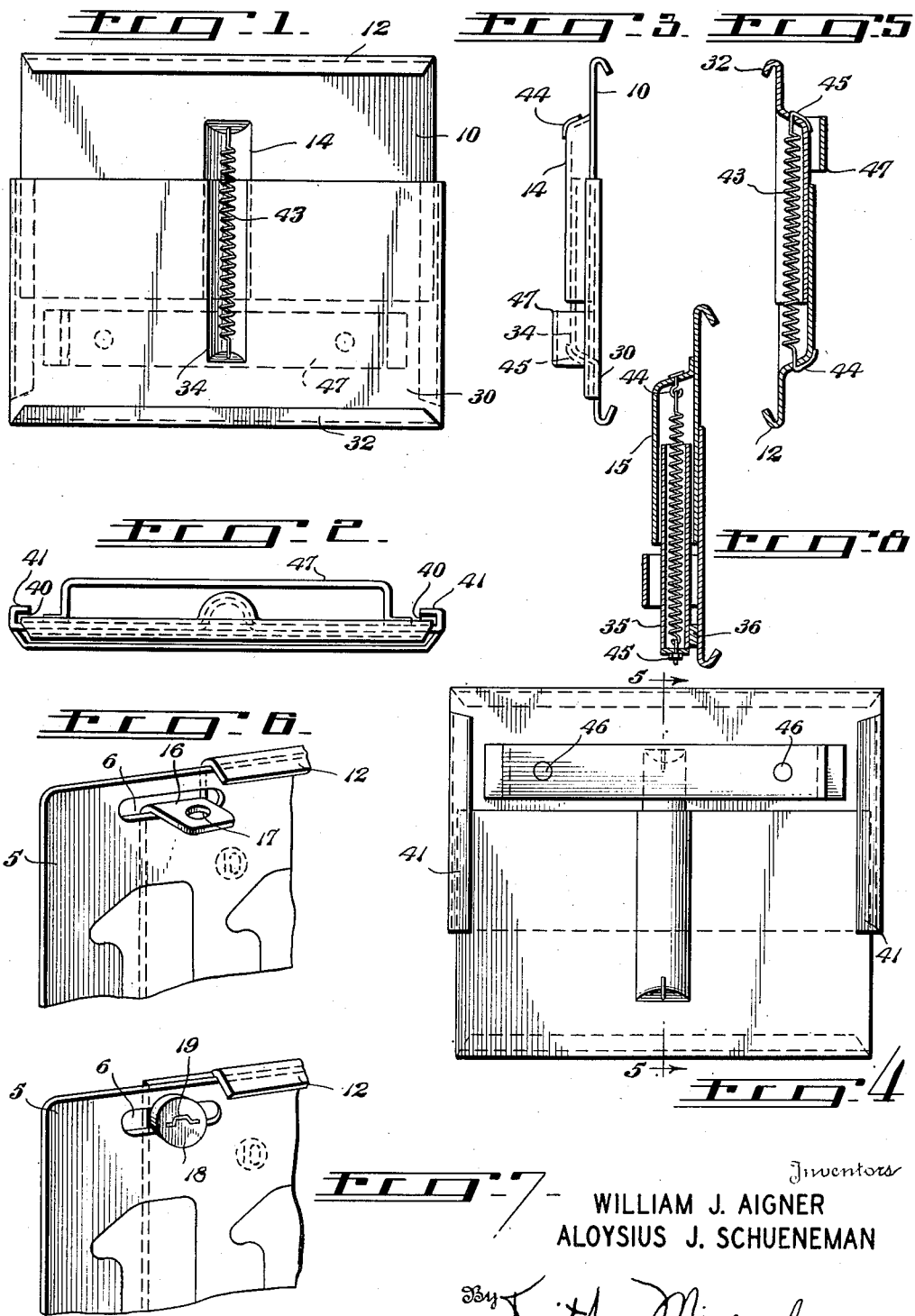
Inventors
WILLIAM J. AIGNER
ALOYSIUS J. SCHUENEMAN Patented June 13, 1944

2,350,993

UNITED STATES PATENT OFFICE 2,350,993

LICENSE PLATE HOLDER

William J. Aigner and Aloysius J. Schueneman, Waukegan, Ill.

Application May 17, 1941, Serial No. 393,862

4 Claims. (Cl. 40—125)

This invention relates to license plate holders for vehicles, and has for its objects the provision of such a holder as will readily accommodate plates of various sizes providing for ease of insertion and removal while holding the plate firmly.

Briefly described the invention is embodied in two sheet-material members arranged in vertical sliding arrangement one in the other, urged together by a tension spring. The upper and lower edges of the cooperating members are provided with flanges which engage the edges of the license plate and thus with the aid of the tension spring, hold the plate firmly. Additional means are provided for housing the spring from external injury and for further securing the plate against removal.

The invention will be exemplified with the aid of the accompanying drawing, wherein—

Figure 1 is a front elevation of the device.

Figure 2 is a top view of the device.

Figure 3 is an end view of the device.

Figure 4 is a rear view of the device, inverted.

Figure 5 is a vertical cross-section of the device along the line 5—5 of Figure 4.

Figures 6 and 7 are enlarged views of a portion of the device showing means for further securing a license plate.

Figure 8 shows a modification of the device and is otherwise similar to Figure 5.

In each of the figures the thickness of the sheet metal parts is exaggerated to improve legibility.

Referring now to the drawing, the holding device is made up of two principal parts, an upper plate 10, and a lower plate 30, provided with license-plate-engaging flanges 12 and 32, respectively. These flanges are most conveniently provided by bending forward the sheet material of which the plates are formed.

The upper plate is arranged to slide freely in channels, 40, formed by bending rearwardly flanges, 41, on the lower plate.

By means of tension spring 43 secured to the upper plate at 44 and to the lower plate at 45, the two plates are drawn toward each other to engage a license plate between flanges 12 and 32. To afford this spring protection it is preferred to house it between the license plate when in position and channels 14 and 34 in the upper and lower plates respectively. These channels are formed in the plates under pressure between appropriate dies. Channel 34 is arranged to fit within channel 14 to prevent water from accumulating in the housing.

It may be somewhat more desirable to provide this housing separately and in such case the modification shown in Figure 8 is employed, wherein channel 15 and tube 35 are secured to the backs of plates 10 and 30 respectively by any suitable method such as brazing or spot-welding. An insert 36 may be employed to space tube 35 a suitable distance from plate 30 if desired.

Obviously, also, for economy or other reasons, it may be desirable to completely eliminate the housing, in which case the spring will merely be fastened to the back of the plates 10 and 30 at points corresponding to the ends of the housing.

The holder assembly is secured to the vehicle by means of mounting bracket 47, secured to the rear of the lower plate by rivetting, welding or brazing, or by other means. Two holes 46 may be provided through which suitable fastening devices may be passed to secure the assembly to a vehicle. It is more desirable to fasten the mounting bracket to the lower plate since if it were secured to the upper plate the tension spring would carry the weight of the lower plate and the license plate, and in such case the vibration of the vehicle in passing over the road would render the hold of the device less secure and more likely to cause squeaks and rattling.

The width of the plates 10 and 30 is selected so that only the flanges 12 and 32 will show when an ordinary license plate of four digits is mounted. This is wide enough to firmly hold the wider plates of six and seven digits between the parallel flanges 12 and 32. It has been found that an extremely narrow holder did not hold the license plate level, as there was a tendency for the plates to cock to one side or the other. The height of each plate 10 and 30 is selected so that when the spring 43 is fully retracted the flanges 12 and 32 are closer than any of the smaller license plates now in use, while when the spring is under maximum tension there is room for any of the licenses having exceptionally tall numerals.

Sometimes it is desirable to prevent unauthorized removal of the license plate, and in such cases the means shown in Figure 6 may be employed. A lug 16 is provided on top of plate 10 of such a size as will pass through the conventional mounting hole 6 in license plate 5. Any suitable securing means, such as a padlock, can then be passed through the hole 17 of the lug.

As shown in Figure 7, plate 10 may be provided with any suitable means (not shown) for receiving and engaging a locking device 18, to be passed through hole 6 in plate 5. Insertion of the key in keyhole 19 permits the lock to be turned on its axis so that the body of the lock will pass through hole 6. The lock may then be rotated so that the rear end thereof is in engagement with the plate 10 and the key is then withdrawn.

It will be seen that there has been provided a license plate holder which is simple and capable of being manufactured in a small number of operations. The holding of the plate is firm and positive, and when desirable this may be supplemented with locking means.

What is claimed is—

1. A license plate holder for automobiles, comprising upper and lower license-supporting plates, each of said plates being less in height than the license but both jointly of greater height than the license plate, rearwardly turned flanges on the opposite sides of one of said supporting plates, providing a channel for the other of said plates to slide vertically therein, a forwardly turned flange on the top of the upper supporting plate, a forwardly turned flange on the bottom of the lower supporting plate, a tension spring secured to the opposite extremities of the supporting plates to urge the supporting plates together to clamp a license plate between the upper and lower flanges and a mounting bracket on the rear of one of said supporting plates to mount the assembly on a vehicle.

2. A license plate holder for automobiles, comprising upper and lower license-supporting plates, each of said plates being less in height than the license plate to be held but both jointly being of greater height, rearwardly turned flanges on the sides of the lower supporting plate, said flanges forming with said lower supporting plate a channel permitting vertical motion but preventing horizontal motion of said upper supporting plate, forwardly turned flanges on the upper portion of said upper supporting plate and on the lower portion of said lower supporting plate, a tension spring fastened to said upper and lower supporting plates to urge the supporting plates together to clamp a license plate between the upper and lower flanges and a mounting bracket on the rear of the lower supporting plate to mount the assembly on a vehicle.

3. A license plate holder for a vehicle, comprising upper and lower license-supporting plates, each of said supporting plates being less in height than the license plate, but both jointly being greater in height, rearwardly turned flanges on the sides of the lower supporting plate, forming with said lower supporting plate a channel permitting vertical, but preventing horizontal motion of said upper supporting plate, forwardly turned flanges on the upper portion of said upper supporting plate and on the lower portion of said lower supporting plate, a vertical recess in the front of said upper supporting plate extending to the bottom of the supporting plate but short of the top of said supporting plate, a vertical recess in the front of said lower supporting plate in alignment with the recess in the upper supporting plate and extending from the top of the lower supporting plate to a point short of the bottom thereof, said recesses in cooperation with the license plate cooperating to form a housing, a tension spring secured to said upper and lower supporting plates within said housing and means on the rear of one of said supporting plates for securing the assembly to a vehicle.

4. A license plate holder for a vehicle, comprising upper and lower license-supporting plates, each of said supporting plates being less in height than the license plate but both jointly being greater in height, rearwardly turned flanges on the sides of one of said supporting plates cooperating with said supporting plate to provide a channel permitting vertical but preventing horizontal movement of the other of said supporting plates, forwardly turned flanges on the top of said upper supporting plate and the bottom of said lower supporting plate, said forwardly turned flanges cooperating when said supporting plates are drawn together vertically to securely clamp and hold a license plate, a tension spring having one each of its ends secured to each of the holder plates to urge them into clamping engagement with a license plate, walls defining a hole in one of said supporting plates in alignment with one of the holes in a license plate, means passing through the aligned holes to fasten the license plate to the holder plate and means on one of the said supporting plates for securing the assembly to a vehicle.

WILLIAM J. AIGNER.
ALOYSIUS J. SCHUENEMAN.